UNITED STATES PATENT OFFICE.

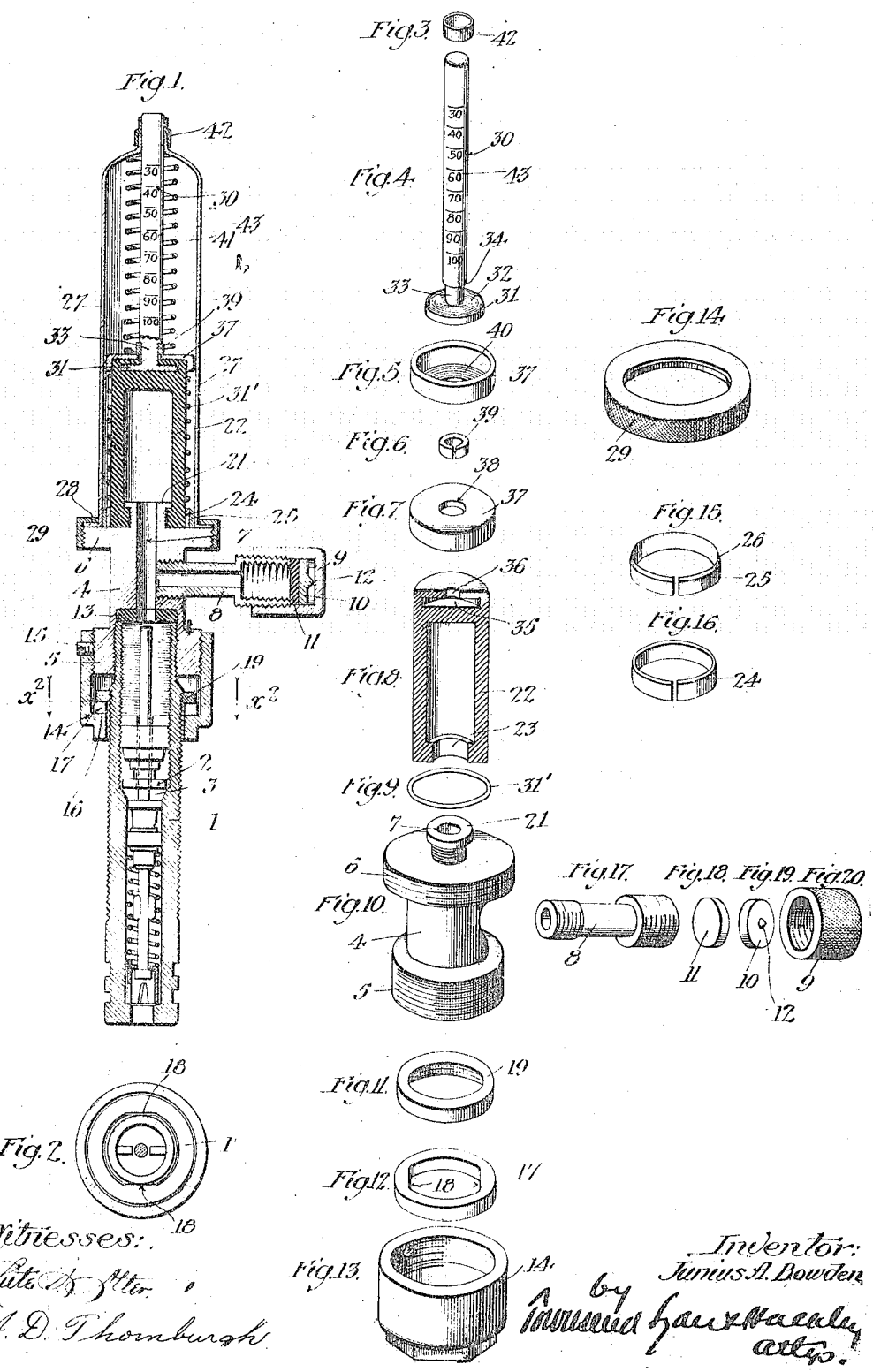

JUNIUS A. BOWDEN, OF LOS ANGELES, CALIFORNIA, ASSIGNOR TO A. SCHRADER'S SON, INCORPORATED, OF NEW YORK, N. Y., A CORPORATION OF NEW YORK.

PRESSURE-GAGE.

1,152,276.  Specification of Letters Patent.  Patented Aug. 31, 1915.

Application filed September 12 1910, Serial No. 581,673. Renewed February 2, 1915. Serial No. 5,781.

*To all whom it may concern:*

Be it known that I, JUNIUS A. BOWDEN, a citizen of the United States, residing at Los Angeles, in the county of Los Angeles and State of California, have invented a new and useful Pressure-Gage, of which the following is a specification.

This invention relates to pressure gages and particularly to one designed for determining the air pressure in a pneumatic tire. In a previous application of mine, filed September 9, 1909, Serial No. 516,953, I have shown and described a pressure gage of this type in which the air chamber is formed as an expansible rubber chamber. The present invention relates to an improved construction and embraces several novel features which make the device more serviceable.

In pressure gages used for determining the pressure in tires, it has heretofore been necessary to provide some means in the gage for depressing the valve stem when the gage was applied to the valve in order to let the air pass from the tire into the pressure gage, and one of the objects of the present invention is to obviate the use of such valve opening means, and I accomplish this by producing a slow leak in the valve, so that when the pressure gage is applied to the valve, the air which is leaking through the valve will pass into the gage to register the pressure, and when the cap of the inlet nipple is removed will prevent escape of air in appreciable quantities and obviate employing a check valve in the inlet nipple.

Another object of the invention is to provide novel and effective means for securing the indicator bar to the rubber air chamber without perforating the walls of the rubber chamber for this purpose.

A further important object is to provide means for securing a perfect air-tight connection between the rubber bulb and the fitting or body portion of the gage.

Another object is to provide novel means for preventing lateral expansion of the rubber air chamber.

A further object is to provide means auxiliary to the rubber air chamber for restoring the latter to its normal volume. The rubber air chamber is protected within a casing through which the indicator bar is projected when compressed air is admitted to the gage, and a further object is to seal the joint between the indicator bar and casing to prevent the entrance of dust and water.

Another object of the invention is to eliminate the necessity of a check valve in the nipple of the gage. When the regulation depresser is used the back flow of air from the tire would rapidly escape during the interval of removing the cap of the inlet nipple and attaching the air hose and again when removing the air hose and attaching the cap to the inlet nipple. A very slow leak will soon fill the small space in the gage and equalize the pressure in the tire and gage. Another advantage is that when the gage is secured to and maintained on the tire, should the gage become loosened, the leak will not allow the tire to become deflated so quickly as where the regular depresser is used.

A further object is to provide a special fitting for securing the gage rigidly and permanently to the inlet tube of the tire and yet enable the fitting to be detached therefrom when desired.

The invention also embraces other advantages which will be brought out in the following detailed description.

Referring to the drawings: Figure 1 is a vertical sectional view through the gage and valve to which the gage is applied. Fig. 2 is a section on line $x^2$—$x^2$ of Fig. 1. Fig. 3 is a perspective of the band which seals the joint between the exterior casing and indicator bar. Fig. 4 is a perspective view in detail of the gage bar. Fig. 5 is a perspective view, inverted, in detail of the cap for the upper end of the rubber air chamber. Fig. 6 is a perspective view of the locking ring which locks the indicator bar to the rubber air chamber. Fig. 7 is a perspective view of the reverse side of the cap shown in Fig. 5. Fig. 8 is a perspective view in section of the rubber air chamber. Fig. 9 is a perspective view of one of the rings for maintaining the lateral dimensions of the air chamber. Fig. 10 is a perspective view of the fitting or body portion of the gage. Fig. 11 is a perspective view in detail of the annular nut for securing the gage to the valve of the tire. Fig. 12 is a perspective view in detail of the washer which fits the flattened sides of the valve of the tire. Fig. 13 is a perspective view in detail of the coupling at the lower end of the gage. Fig. 14 is a perspective view of the annular flanged nut for securing the casing to the body of the gage. Fig. 15 is a perspective view of the beveled split ring at the bottom of the air chamber. Fig. 16 is a perspective view of another split ring at the bottom of the air chamber. Fig. 17 is a perspective view of the inlet nipple. Fig. 18 is a perspective view in detail of the air seal for the inlet nipple. Fig. 19 is a perspective view in detail of the pressure plate for the inlet nipple. Fig. 20 is a perspective view of the cap for the inlet nipple.

1 designates the threaded nipple of the tire valve within which is the valve 2 of well known construction. In order to produce a slow leak in the valve, I remove the rubber which occupies the annular space 3 which permits the air to pass slowly outward through the valve nipple 1. It should be understood that this rubber which is removed is not the valve but the gasket which seats against the internal shoulder of the nipple 1. With this rubber gasket removed, air will slowly leak up past flange 2 and past the threaded portion of the valve into the passage 7.

4 designates the body portion of the gage which is formed with a lower threaded flange 5 and an upper threaded flange 6 and with a longitudinal air passage 7. Screwed into the fitting at right angles thereto is an inlet nipple 8 which communicates with the air passage 7, the outer end of the nipple being closed by a cap 9 which bears against a pressure plate 10, the latter holding a rubber disk 11 against the end of the nipple and thereby rendering the same air-tight. The pressure plate 10 is formed with a central conical projection 12 against which the cap 9 bears and by means of which the plate 10 bears with a uniform pressure throughout its entire area against the disk 11, which insures a perfect fit preventing leakage of air. By removing the cap 9 and plate 10 and disk 11, air may be pumped through the nipple 8 to inflate the tire, air entering freely through the valve along the valve stem in the well known manner. It should be understood that the air which enters in the regular manner through the valve necessarily passes through the space 3 as well as air which escapes by the slow leak. The slow leaking air however, does not pass along the valve stem but passes around the outer edge of the flange 2.

The lower end of the fitting 4 is enlarged to fit over the upper end of the valve nipple 1 and a rubber gasket 13 forms an airtight joint at this point. The fitting is secured to the valve nipple by means of a sleeve 14 which is screwed to the lower flange 5, a set screw 15 preventing the accidental unscrewing of the sleeve 14. The sleeve 14 has a shoulder 16 against which rests a washer 17 having flattened sides 18 which fit the well known flattened surfaces of the valve nipple 1, so that the washer 17 is prevented from rotating. An annular nut 19 is screwed on the valve nipple 1 and the washer 17 abuts against the same, the parts being firmly secured together by screwing the fitting into the sleeve 14. The upper end of the fitting 4 is formed with a flanged boss 21 externally grooved, and secured thereto is an expansible rubber air chamber 22, the latter being cylindrical in form and entirely closed except at its lower end, at which point it is formed with an inwardly directed flange 23 which fits under the flange of the boss 21 and is secured thereto by two split rings 24 and 25. The inner ring 24 is first placed in position, then the outer ring 25 is placed over the inner ring 24, the joints of the rings being out of line with each other. The outer ring 25 has an upper beveled edge 26 and after the two rings 24 and 25 are in position, a casing 27 is pushed down over the outer ring 25. It will be noted that the lower portion of the casing 27 acts in the capacity of an encircling ring or band to crowd the split ring 25 tightly against the split ring 24 and cause the latter to compress the lower end of the rubber air chamber 22 into the closest possible union with the flanged boss 21 and thereby prevent leakage at this point and at the same time mechanically secure the rubber air chamber 22 to the fitting 4 in such a manner that it can not come off. By tapering the upper edge of the outer ring 25, it is possible to force the casing 27 into position. This method of securing the air chamber to the fitting is particularly effective, considering the small space afforded for the securing means.

The lower end of the casing 27 is provided with a flange 28 which abuts against the flange 6 and a flanged nut 29 engages the flange 28 and holds the casing 27 firmly in position. When thus secured, it is obvious that the lower end of the rubber air chamber 22 is prevented from expanding and therefore its inwardly directed flange 23 cannot possible become disengaged from the flanged boss 21.

Secured to the upper end of the air chamber 22 is an indicator bar 30, the lower end of which is formed with a flange 31, the upper face of which is formed with annular grooves 32. A neck 33 is formed between the indicator bar 30 and the flange 31, thus leaving a shoulder 34. The flange 31 is received in a pocket 35 formed in the upper portion of the air chamber, there being an orifice 36 through the upper wall giving communication with the pocket, but the pocket 35 has no communication with the interior of the air chamber. The flange 31 is inserted through the hole 36 by stretching the rubber and after the flange 31 is received in the pocket 35, the upper wall closes around the neck 33 of the indicator bar, as shown in Fig. 1. A cap 37 is then placed over the upper end of the air chamber, the cap 37 having an orifice 38 through which the indicator bar 30 loosely passes, as shown in Fig. 1, and then a split locking ring 39 is slipped over the neck 33 above the cap 37 and takes against the shoulder 34 thereby securely holding the cap 37 in place, which prevents the upper wall of the air chamber from pulling outwardly. The inner bottom wall of the cap 37 is also formed with concentric corrugations 40 which, combined with the corrugations 32, grip the rubber forming the top wall of the air chamber on both sides and thereby assist in the more firmly securing the indicator bar in position.

In order to prevent the air chamber from expanding laterally, I encircle it with wire. Preferably, I employ a plurality of wire rings 31', one of which is shown in detail in Fig. 9. Each ring 31' is endless and thus there is no chance of puncturing the rubber. These rings are spaced apart a sufficient distance to retain the air chamber to its lateral dimensions and yet allow it to elongate longitudinally when the air under pressure is admitted to its interior.

Within the casing 27 is a coil spring 41 which bears against the cap 37 and serves to assist in restoring the air chamber to its normal condition. The spring 41 also adds its resistance to that afforded by the rubber walls of the air chamber, so that while the air chamber is depended upon for the air storage and acts as an air-tight pocket in communication with the tire to retain the air and expand under the air pressure, the resistance to such expansion is afforded only in part by the rubber air chamber, the spring 41 acting in conjunction therewith.

In order to prevent the entrance of dust or water at the upper end of the casing 27, I employ a rubber collar 42 which is clasped tightly over the upper end of the casing 27 and snugly fits the indicator bar 30. The rubber member 42 at the top has a normal diameter which is its smallest diameter, as shown in contact with the scale bar, while that portion which is stretched engages the casing. Thus the smaller diameter of the rubber does not tend to grip the scale bar tightly enough to produce friction which would materially retard the movement of the scale bar. The indicator bar 30 is provided with graduations 43 which are exposed to view as the indicator bar is moved out during the expansion of the air chamber 22.

It should be understood that one of these devices is applied to the air valve of each tire and remains there permanently, being at all times in communication with the air pressure within the tire by reason of the slow air leak provided, and thus the indicator bar will always protrude from the casing and indicate the exact pressure which is within the tire, so that a glance suffices to tell whether the tire needs inflating or not. When inflation is needed, it is a simple matter to remove the cap 9 and inflate through the inlet nipple 8.

What I claim is:

1. In a pressure gage a longitudinally expansible cylindrical rubber air chamber imperforate except at its inner end, the longitudinal walls of said chamber being straight and coils of wire surrounding the chamber, preventing it from expanding laterally, an indicator bar bearing against the outer end of said chamber, the outermost coil of wire lying at a point near the outer end of said chamber, a retarding spring having one end bearing against the top of said chamber, means supporting the other end of the spring, a casing having an opening in its outer end and surrounding said chamber and bar, said chamber adapted to operate the bar outwardly and inwardly through said opening to directly indicate the pressure, and means for securing the gage to the inlet tube of a tire.

2. In a pressure gage, a rubber air chamber, said air chamber having a pocket in one end, an indicator bar having a flange on its end which is seated in said pocket, and means for holding the upper wall of said pocket against said flange.

3. In a pressure gage, a rubber air chamber, said air chamber having a pocket in one end, and an indicator bar having a flange on its end which is seated in said pocket.

4. In a pressure gage, a fitting adapted to be connected with the tire, said fitting having a flanged boss on its end, a rubber air chamber having an inwardly directed flange at its lower end engaging said flanged boss, means co-acting with the foregoing elements for measuring the expansion of said chamber, and means for holding said flanged end of the air chamber tight against said boss.

5. In a pressure gage, a fitting adapted to be connected with the tire, said fitting having a flanged boss on its end, a rubber air chamber having an inwardly directed flange at its lower end engaging said flanged boss, means for measuring the expansion of said chamber, a split ring encircling said flanged end of the air chamber, said means including a continuous circular casing girdling said split ring.

6. In a pressure gage, a fitting adapted to be connected with the tire, said fitting having a flanged boss on its end, a rubber air chamber having an inwardly directed flange at its lower end engaging said flanged boss, means for measuring the expansion of said chamber, a split ring encircling the flanged end of the air chamber, another split ring encircling the first split ring and having a beveled edge, said measuring means including a casing with its lower end girdling the outer split ring and holding the rings tight against the air chamber to force the flange of the latter into air-tight engagement with the flanged boss.

7. In a pressure gage, a fitting formed with a flanged lower end and a flanged upper end and having a boss on its upper end, means for securing said fitting to an air tube having flattened sides, said means comprising an annular nut screwed to and near the top of said air tube, forming a shoulder thereon, and a washer having inner straight sides adapted to register with the flattened sides of said air tube and placed below said nut, and a sleeve having a shoulder, the upper end of said sleeve adapted to be secured to said flanged lower end and said shoulder adapted to bear against the lower part of said washer, and an expansible air chamber secured to said boss.

8. In a pressure gage for tires comprising a fitting, an expansible air chamber secured to said fitting, means for securing the fitting to an inlet tube of a tire, said tube having flattened sides, said means comprising an annular nut secured to and near the top of said tube forming a shoulder thereon, a washer having inner straight sides adapted to register with the flattened sides of said air tube and placed below said nut, and a sleeve adapted to be secured to the lower end of said fitting, said sleeve having an inner flange and the flange adapted to bear against the lower part of said washer.

9. As a new article of manufacture, a rubber air chamber for pressure gages having an end wall provided with a laterally extending cavity with a reduced outer opening, said air chamber having an opening at its opposite end.

10. In a pressure gage for tires, an expansible body, a casing surrounding said body, means for securing the casing to said body, a gage bar in contact with said body and protruding through said casing, compressible means for resisting the outward movement of the gage bar, a flexible collar attached to said casing where the gage bar projects, the collar surrounding the gage bar.

11. In a pressure gage, a rubber air chamber imperforate except at its inner end, a gage bar, means for detachably gripping the gage bar to said chamber at its outer end, a casing surrounding said chamber, means securing said casing to said chamber, the gage bar protruding through said casing, and a coil spring around the gage bar within the casing, one end of the spring bearing against the end of the air chamber and the other end bearing against the chamber.

12. In a pressure gage, a casing having a flanged bottom, a body adapted to connect with the inlet tube of a tire, said body having a central boss and a flange, said flanged bottom registering with the flange of said body, and means for securing said flanges together, a rubber air chamber secured to said boss within said casing, a gage bar, one end of said bar bearing on the outer end of the air chamber and the other end protruding through the outer end of said casing, compressible means for resisting outward movement of the gage bar.

13. In a pressure gage, a fitting adapted to be connected with a tire, a rubber air chamber imperforate except at its inner end, and having straight outer walls, the inner end of said chamber held in air-tight contact with the upper part of said fitting, by means of a split ring encircling the outside portion of the inner end of said air chamber and a continuous circular member forced over said split ring, adapted to close it over the end of said chamber, and means for measuring the expansion of said chamber.

14. In a pressure gage, a casing, a fitting, a rubber air chamber inclosed in said casing, means for securing the inner end of said chamber to the fitting, means for securing the casing to the fitting, means for securing the fitting to an inlet tube of a tire, a flanged cap adapted to fit the outer end of said chamber whereby expansion of the outer end of said chamber is equalized, a retarding spring between said cap and casing, and means for measuring the expansion of said chamber.

15. In pressure gages for pneumatic tires, a cylindrical rubber air chamber, having an opening in one end and the other end closed, a cap bearing on the closed end, means at the closed end for securing an indicator bar detachably thereto, a cylindrical casing with an opening in its outer end, said casing adapted to loosely surround the chamber and indicating bar, a coil spring surrounding the indicator bar and bearing between the air chamber and casing, said bar adapted to protrude through the opening in said casing and directly show the air pressure, said chamber having wire below said cap surrounding its exterior side walls.

16. In pressure gages for pneumatic tires, a cylindrical casing having an opening in its outer end, a cylindrical rubber air chamber within the casing having an opening in its inner end and the outer end closed, wire surrounding the exterior side walls of said chamber a detachable cap adapted to be secured to said closed end, an indicator bar detachably secured to said closed end by said cap, a coil spring surrounding said indicator bar and inclosed in said casing and bearing between the air chamber and casing, said cap extending to the inside walls of said casing and coöperating therewith whereby the air chamber and indicator bar are guided to move parallel with said casing, the indicator bar adapted to protrude through said opening in the casing.

17. In a pressure gage, a cylindrical rubber air chamber having straight longitudinal walls, an indicating bar, a cylindrical casing surrounding said casing and bar, said indicating bar being at the outer end of said chamber and protruding through said casing, a recessed cap detachably secured to the outer end of said chamber, wires surrounding said chamber below said cap, a coil spring surrounding said indicating bar, said spring seated on the top side of said cap and bearing against said casing.

18. In a pressure gage, a tubular rubber air chamber, said chamber of constant diameter open at one end and the other end closed, a body portion, means for securing said chamber at its open end to said body portion, a detachable recessed cap bearing against the closed end of said chamber, an indicator bar at the closed end of said chamber, a coil spring surrounding said bar and bearing against the air chamber and casing, a casing secured to said body portion, said bar adapted to protrude through the outer end of said casing, wire surrounding the exterior walls of said chamber below said cap, means for detachably securing said body portion to the inlet tube of a tire.

19. In a pressure gage, a rubber body portion, a metal body portion with an opening, means for securing said rubber body portion to the metal body portion in air tight engagement, means for securing the metal body portion to the inlet tube of a tire, said rubber body portion having a centrally located pocket in its top, an indicating bar with a flange on one end, said flange and said pocket adapted to detachably fit in close engagement with each other, and means for measuring the expansion of said rubber body portion.

20. In a pressure gage, a rubber air chamber having an opening in one end and the other end being closed, means integral with the air chamber at the closed end for attaching a gage bar centrally thereto, means for resisting outward movement of the air chamber, a body having a boss on one end and a recess on the other end, said chamber secured at its open end to said boss, a casing attached to said body and surrounding said chamber, and means for securing the body at its recess end to the inlet tube of a tire.

21. In a pressure gage a longitudinally expansible rubber air chamber imperforate except at its inner end, the outer surface of the longitudinal walls of said chamber being of constant diameter and rings surrounding said air chamber, said rings being of uniform diameter and preventing lateral expansion of said walls, a gage bar operated by the end of the chamber, and means independent of said rings for opposing longitudinal expansion of the air chamber.

22. In pressure gages for tires, a body, a rubber air chamber having non-folding longitudinal walls and closed on one end, the other end open, a cap on the closed end, the chamber at its open end secured to said body, wire surrounding said chamber, the wire being below said cap, a gage bar at its inner end adapted to connect with said cap, a coil spring surrounding said bar and one end of the spring resting on the upper side of said cap, the other end bearing against the casing, a casing having an opening in its outer end, said casing surrounding said body, the outer end of the bar adapted to protrude through the opening in said casing, and means for securing the gage to the inlet tube of a tire.

23. As a new article of manufacture a rubber air chamber for pressure gages, imperforate except for an opening in one end, the external wall being substantially cylindrical, and an abrupt internal flange at said end.

24. In air pressure gages for tires, a rubber air chamber, imperforate except for an opening in one end, an internal flange at said end; said flange at its upper portion having an abrupt shoulder, and means exerting inward radial compression against the outer side wall of said lower end for securing the flange in air tight engagement with other means for attaching the gage to the inlet tube of a tire.

In testimony whereof, I have hereunto set my hand at Los Angeles, California, this 2d day of September, 1910.

JUNIUS A. BOWDEN.

In presence of—
G. F. HACKLEY,
FRANK L. A. GRAHAM.